United States Patent [19]

Maruyama et al.

[11] Patent Number: 5,646,604
[45] Date of Patent: Jul. 8, 1997

[54] MOBILE UNIT AND A METHOD FOR ENABLING A DIAL LOCK IN THE MOBILE UNIT

[75] Inventors: Minoru Maruyama; Shuuji Fujiwara, both of Kawasaki, Japan

[73] Assignee: Fujitsu Limited, Kanagawa, Japan

[21] Appl. No.: 378,397

[22] Filed: Jan. 26, 1995

[30]  Foreign Application Priority Data

Jun. 30, 1994 [JP] Japan .................................. 6-149110

[51] Int. Cl.$^6$ .................................................... H04M 1/66
[52] U.S. Cl. .................. 340/825.31; 340/825.56; 455/565; 455/411; 455/566
[58] Field of Search ........................ 340/825.31, 825.34, 340/825.5, 825.56, 825.44, 825.47, 311.1; 379/58–63, 91; 380/4, 23, 25, 30; 455/33.1, 54.2, 89

[56]  References Cited

U.S. PATENT DOCUMENTS

| | | | |
|---|---|---|---|
| 4,724,537 | 2/1988 | Monet | 379/63 X |
| 5,177,478 | 1/1993 | Wagai et al. | 340/825.44 |
| 5,337,345 | 8/1994 | Cassidy et al. | 379/58 |
| 5,343,529 | 8/1994 | Goldfine et al. | 340/825.31 X |
| 5,373,289 | 12/1994 | Ichinohe | 340/825.56 |
| 5,423,079 | 6/1995 | Namiki et al. | 379/62 X |
| 5,495,520 | 2/1996 | Kojima et al. | 379/62 |

FOREIGN PATENT DOCUMENTS

| | | | |
|---|---|---|---|
| 63-38358 | 2/1988 | Japan . | |
| 4-115758A | 4/1992 | Japan | 340/825.31 |

*Primary Examiner*—Michael Horabik
*Assistant Examiner*—William H. Wilson, Jr.
*Attorney, Agent, or Firm*—Helfgott & Karas, P.C.

[57]  ABSTRACT

A mobile unit having a unit for transmitting and receiving signals to and from a base station by radio telephony, an input unit for use in entering information, a display and a control unit, is provided with a first memory in which "unwritten" or "written" is stored as a state of a password for enabling the dial lock, and a second memory in which a password for enabling the dial lock is stored. When a dial lock signal is supplied from the input unit, the control unit writes a password entered at the input unit in the second memory and changes the state of a password in the first memory from "unwritten" to "written." Thereafter, except after providing the password, the mobile unit cannot be used for calling. Moreover, the password cannot be modified.

10 Claims, 8 Drawing Sheets

MOBILE UNIT AND A METHOD FOR ENABLING A DIAL LOCK IN THE MOBILE UNIT

BACKGROUND OF THE INVENTION

1. Field of the Invention

The present invention relates to a mobile unit having a dial lock function and a method for enabling the dial lock in the mobile unit.

In an effort to prevent stolen mobile units, including portable telephones and automobile telephones, from being used illegally, it is known that a password can be used to enable the dial lock. Once the dial lock is enabled, calling is enabled only when an inputted password agrees with the registered password. It is required to enable the dial lock reliably and safely.

2. Description of the Related Art

Normally, when a mobile unit is delivered by a communication company to a user, if the user wants to enable a dial lock function, a password declared by the user is written as a dial lock password in a programmable read-only memory (PROM) in the mobile unit by means of a ROM writer. A personal identification (ID) number for verification, used to connect with a mobile communication network, must also be assigned to the mobile unit. The personal ID number is also written by the ROM writer.

A password for enabling a dial lock is usually composed of four numerical characters. The password is written in a PROM in a mobile unit by means of a ROM writer. For calling, when the password is entered, dial lock is unlocked. Calling is then enabled. Any person who does not know the password cannot use the mobile unit. That is to say, the legal user of a mobile unit will not be charged for illegal use of the mobile unit.

The personal ID number for verification to be set in a mobile unit is unique. The personal ID number for verification can therefore be predetermined by a communication company or a manufacturer and need not be designated by a distributor dealing in mobile unit. However, the password is determined by the user who wants to enable the dial lock and is declared to a distributor. In this case, if all distributors were equipped with a ROM writer, to write or modify personal ID numbers, there would be no problem. In reality, however, a ROM writer is installed only at reliable strategic distributors' offices.

A user who wants to enable a dial lock declares the password to a distributor. The distributor transports the mobile unit to an office equipped with a ROM writer for writing passwords and asks the office staff to write the password in memory. The mobile unit is returned to the distributor and then handed to the user who has been asked to come the office. In other words, a user who wants to enable a dial lock cannot use his mobile unit while it is at the distributor's office. Moreover, since the password is declared to the distributor, the password may be stolen.

SUMMARY OF THE INVENTION

An object of the present invention is to make it possible to enable a dial lock, with great safety, by manipulating the mobile unit alone.

To attain the foregoing object, the present invention provides a mobile unit comprising a means for transmitting and receiving signals to and from a base station by radio telephony, an input means for use in entering information, a display means, a first memory in which "unwritten" or "written" is stored as the state of the password for enabling the dial lock, a second memory in which a password for enabling the dial lock is stored, and a means that controls the transmitter receiver means and display means, that determines whether a dial lock enable signal has been supplied from the input means and that writes a password entered at the input means into the second memory when the dial lock enable signal is supplied and changes the state of the password, stored in the first memory, from "unwritten" to "written."

Owing to the foregoing configuration, the dial lock can be enabled by merely manipulating a mobile unit without a ROM writer. Once the dial lock is enabled, "written" is set as the state of the password in the first memory. Thereafter, unless the password is entered, the mobile unit cannot be used for calling.

According to the present invention, when the state of the password in the first memory is "written," enabling a dial lock using the input means can be prevented. Consequently, an illegal user is prevented from entering another password and stopping the legal user from using the mobile unit.

According to the present invention, for modifying the password, a ROM writer is connected externally to a mobile unit. The mobile unit executes a given operation so as to encode a stored password and transmits an encoded password to the ROM writer. The ROM writer decodes the received password by executing an operation whose logic is inverse to that of the previous operation, and transmits the decoded password to the mobile unit. If the connected ROM writer is an authorized one, the password returned to the mobile unit is identical to the stored one.

The foregoing sequence helps prevent an unauthorized user from modifying a password.

According to the present invention, when dial lock is unlocked, "written" may be set as the state of the password the first memory and a password meaning that dial lock is disabled, for example, 0000 may be written in the second memory. Thus, a user who wants to use a mobile unit is relieved from the bother of entering a password every time before making a call. Moreover, when the state of the password in the first memory is "written," an unauthorized user cannot enable a dial lock to stop an authorized user from using a mobile unit.

According to the present invention, when a mobile unit is used several times with dial lock disabled, "written" may be automatically set as the state of the password in the first memory and a password meaning that dial lock is disabled may be written in the second memory. Consequently, a user is relieved from the bother of designating that dial lock will be disabled. Moreover, an unauthorized user can be prevented from enabling the dial lock.

BRIEF DESCRIPTION OF THE DRAWINGS

The above object and features of the present invention will be more apparent from the subsequent description of the preferred embodiment with reference to the accompanying drawings, wherein.

DESCRIPTION OF THE PREFERRED EMBODIMENTS

Figure 1:
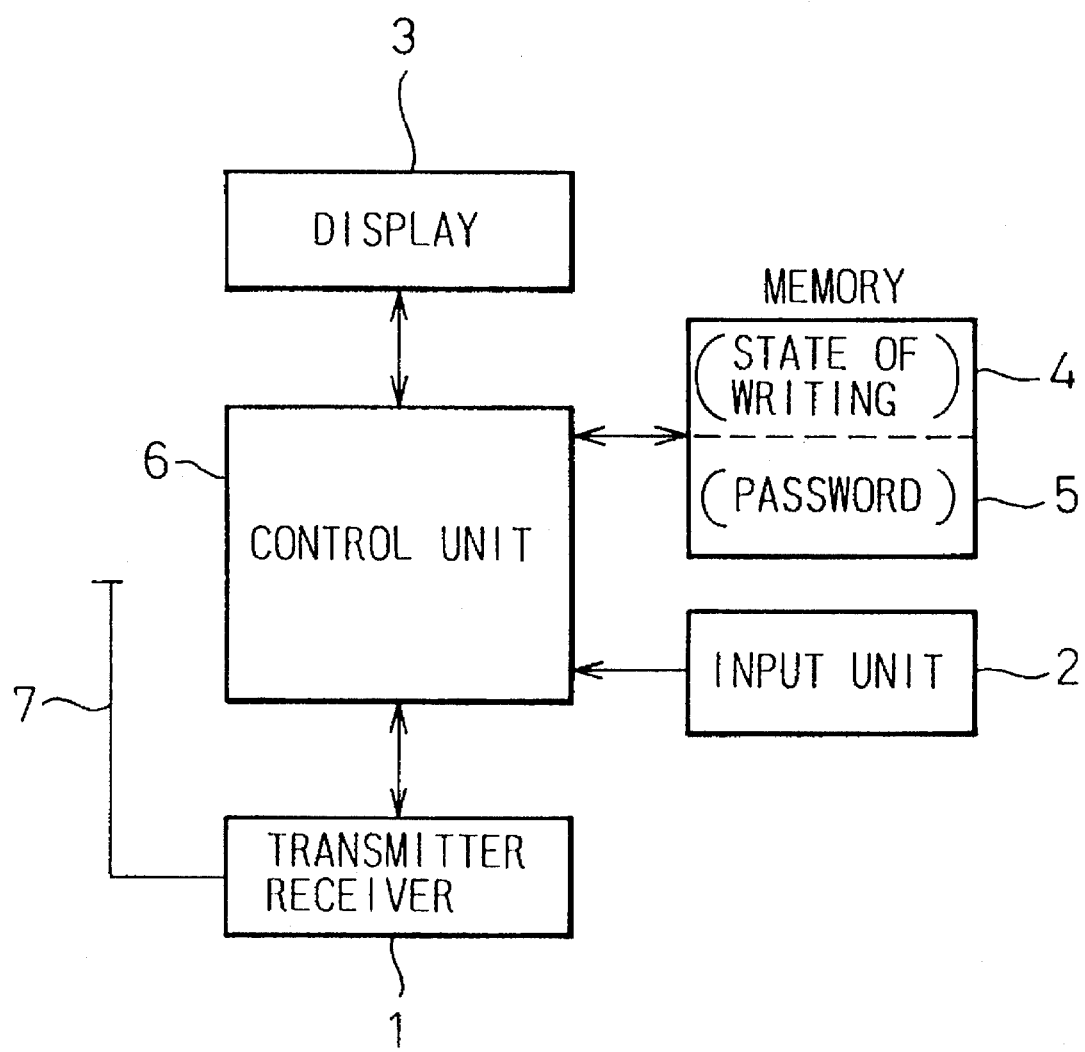
FIG. 1 is a block diagram showing an overall configuration of an embodiment of the present invention.

Referring to FIG. 1, an overall configuration of a mobile unit in accordance with the present invention will be described. A portable telephone or an automobile telephone for achieving radio transmission and reception relative to a base station comprises a transmitter receiver 1 for transmitting and receiving signals to and from a base station by radio telephony, an input unit 2 for use in entering information, such as a dial, a display 3 for displaying the contents of information entered at the input unit 2, a first memory 4 in which "unwritten" or "written" is stored as the state of the password for enabling a dial lock, a second memory 5 in which a password set for enabling the dial lock is stored, and a control unit 6 for controlling the transmitter receiver 1 and display unit 3, determining whether dial lock is designated to be enabled at the input unit 2, identifying a password entered at the input unit 2, writing the password in the second memory 5 according to whether dial lock is enabled, and changing the state of the password in the first memory 4 from "unwritten" to "written." Reference numeral 7 denotes an antenna.

The transmitter receiver 1 connected to the antenna 7 includes a radio-frequency circuit, a demodulator, and a handset, and transmits and receives signals to and from a base station (not shown) by radio telephony. The input unit 2 includes a key pad and is used to dial a telephone number for calling. The display 3 displays the contents of information entered at the input unit 2, the date, the call duration, and guidance. Each of the first memory 4 and second memory 5 is realized by, for example, a programmable read-only memory (PROM). In the first memory 4, "unwritten" or "written" is stored as the state of the password. In the second memory 5, a password set for enabling the dial lock is stored. The control unit 6 controls the dial lock according to the information entered at the input unit 2. Only when the state of the password in the first memory 4 is "written," does the control unit 6 enable dial lock enabling, write a password set for enabling the dial lock in the second memory 5, and change the state of the password in the first memory 4 from "unwritten" to "written."

The control unit 6 is composed of a microprocessor and others. Only when the state of the password in the first memory 4 is "unwritten," does the control unit 6 enable the dial lock enabling designated at the input unit 2 and store a password entered at the input unit 2 in the second memory 5. When the state of the password in the first memory 4 is "written," even if dial lock enabling is designated at the input unit 2, the control unit 6 ignores the designation; that is, it prevents dial lock enabling. The control unit 6 may use the display 3 to indicate that a password has been written and thus inform the user of the fact.

A third memory (not shown) may be included so that the number of calls allowed with dial lock disabled may be set therein. When the number of calls allowed with dial lock not validated exceeds the number of calls exist in the third memory, the control unit 6 changes the state of the password in the first memory 4 from "unwritten" to "written," and sets a password, for example, 0000 meaning that dial lock is disabled in the second memory 5.

Even when dial lock is disabled, a call is enabled normally. The number of calls enabled with dial lock disabled is set in the third memory. After many calls are made with dial lock disabled, the number of calls is counted. When the counted number of calls exceeds the number of calls existed in the third memory, the state of the password in the first memory 4 is changed from "unwritten" to "written." The password set in the second memory 5 is changed to a password meaning that dial lock is disabled. Thereafter, no password can be set for dial lock.

A dial lock request and a password are entered at the input unit 2. The password is displayed on the display 3. A password is entered at the input unit 2 again. The control unit 6 compares the password entered previously with the one entered subsequently. When the passwords agree, the control unit 6 recognizes that the passwords have the value designated by a user, and writes the password value in the second memory 5. Upon completion of writing, the control unit 6 changes the state of the password in the first memory 4 from "unwritten" to "written."

When the state of the password in the first memory 4 is "written," dial lock cannot be enabled in the mobile unit using a new password. A ROM writer installed in a highly-reliable office is used to change "written" set in the first memory 4 into "unwritten." To be more specific, the mobile unit executes an operation to encode a password. On receipt of the encoded password, the ROM writer executes an operation to interpret the password, and returns a resultant password to the mobile unit. The mobile unit compares the returned password with the one stored therein, and thus determines whether the ROM writer is authorized. That is to say, only when requested by an authorized ROM writer, the mobile unit resets the state of writing a password existent in the first memory 4 to an initial value representing "unwritten." The mobile unit can now be used by a new user.

Figure 2:
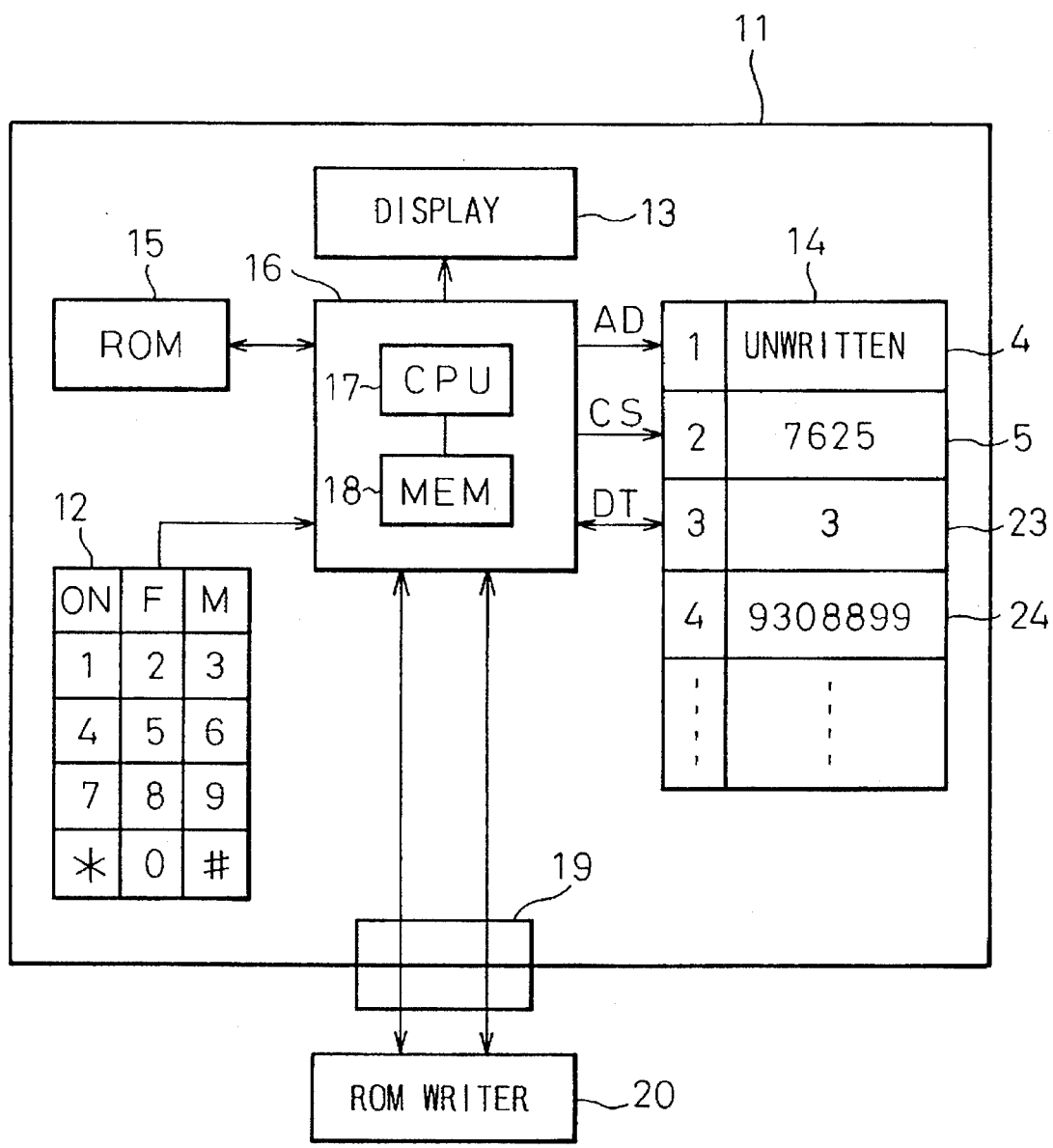
FIG. 2 is a block diagram showing major components of a mobile unit in accordance with the embodiment of the present invention.

FIG. 2 is an explanatory diagram detailing a mobile unit in accordance with an embodiment of the present invention. Reference numeral 11 denotes a mobile unit. 2 denotes an input unit such as a key pad. 3 denotes a display such as a liquid crystal display. 14 denotes an electrically erasable programmable read-only memory (EEPROM). 15 denotes a read-only memory (ROM) storing a program or the like. 6 denotes a control unit. 17 denotes a microprocessor (serving as a CPU). 18 denotes a memory (MEM) such as a random-access memory (RAM). 19 denotes a connector. 20 denotes a ROM writer. In FIG. 2, the input unit 2 has numerical buttons 0 to 9, a * button, a # button, an F button for invoking various functions, an M button for designating storage in a memory, and an ON button for turning on or off the power supply. It is understood that the input unit 2 may include other buttons having different capabilities.

Reference numeral 4 denotes a first memory area in which the state of the password is stored. 5 denotes a second memory area in which a password is stored. 23 denotes a third memory area corresponding to the aforesaid third memory in which the number of calls enabled is set. 24 denotes a fourth memory area in which a password is stored. AD denotes an address signal. CS denotes a control signal. DT denotes data. Components corresponding to the transmitter receiver 1 and antenna 7 shown in FIG. 1 are not illustrated. In FIG. 2, the mobile unit 11 is connected to the ROM writer 20. Using the mobile unit 11 alone, dial lock can be enabled.

In the embodiment shown in FIG. 2, the first memory area 4 is located at the leading address in the memory 14, wherein "unwritten" or "written" is stored as the state of the password. Initially, "unwritten" is set. "Unwritten" and "written" are represented by a 0 and a 1 respectively. The second memory area 5 is located at the second address in the memory 14, wherein four numerical characters, for example 7625, is stored as a password. The third memory area 23 is located at the third address therein, wherein the number of speeches enabled with dial lock not validated, for example, 3 is stored. The fourth memory area 24 is located at the fourth address therein, wherein a password, for example 9308899, is stored.

The mobile unit 11 is handed to a user with a personal ID number for verification and a telephone number written therein. However, the initial value representing "unwritten" is set in the first memory area 4 at the leading address in the memory 14. If the user receiving the mobile unit 11 wants to enable a dial lock, he/she uses the input unit 2 to enter a dial lock request and a password. The microprocessor 17 in the control unit 6 runs a program stored in the ROM 15 so as to transfer an address signal AD representing the leading address and a control signal CS instructing reading to the memory 14. With the signals, the state of the password "unwritten" is read from the leading address in the memory 14 and transferred as data DT to the microprocessor 17.

The microprocessor 17 recognizes the state of the password as "unwritten" and then transfers an address signal AD representing the second address, a control signal CS instructing writing, and the data DT concerning the password entered at the input unit 2 to the memory 14. Thus, the password is written at the second address in the memory 14. Upon completion of writing, the address signal AD representing the leading address, the control signal CS instructing writing, and the data DT representing "written" are transferred to the memory 14. The contents of the leading address in the memory 14 are then updated; that is, changed from "unwritten" to "written." Thus, dial lock is enabled. When "written" is stored in the first memory area 4 at the leading address in the memory 14, it is impossible to enable the dial lock using another password.

Figure 3:
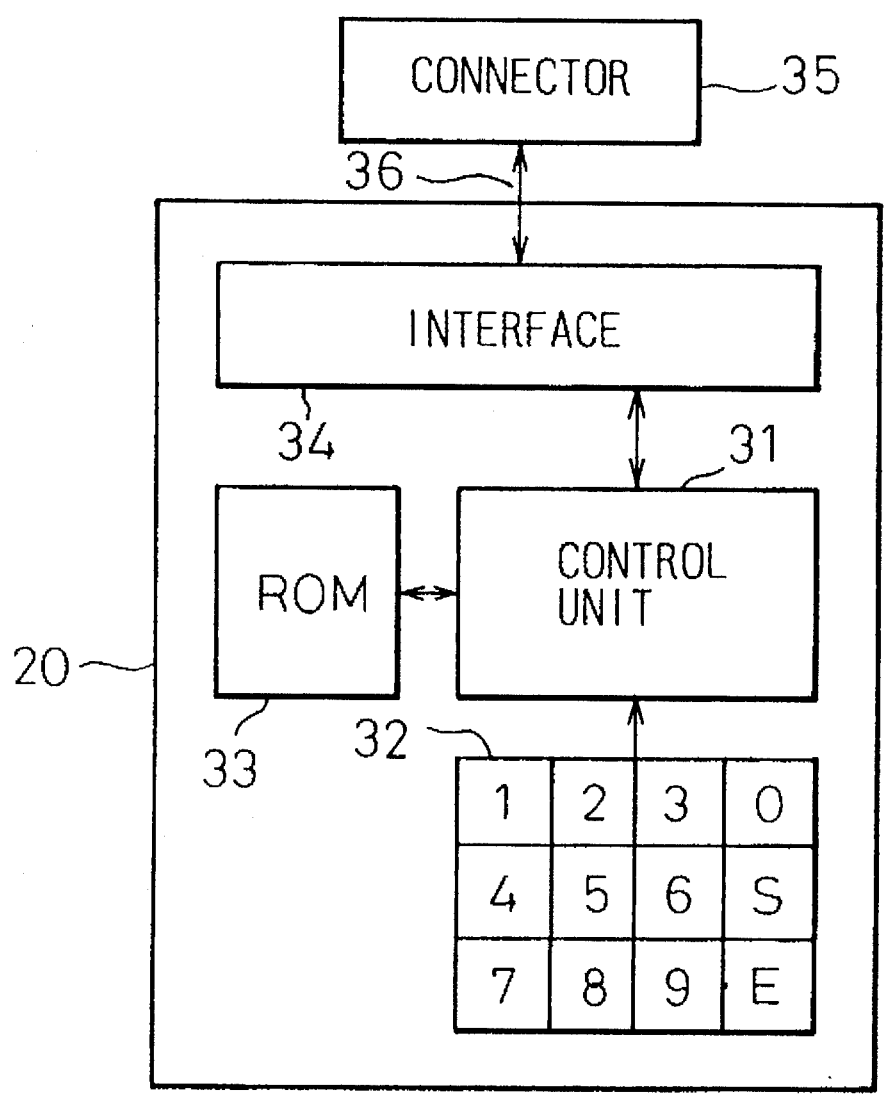
FIG. 3 is a block diagram for explaining a ROM writer.
Figure 4:
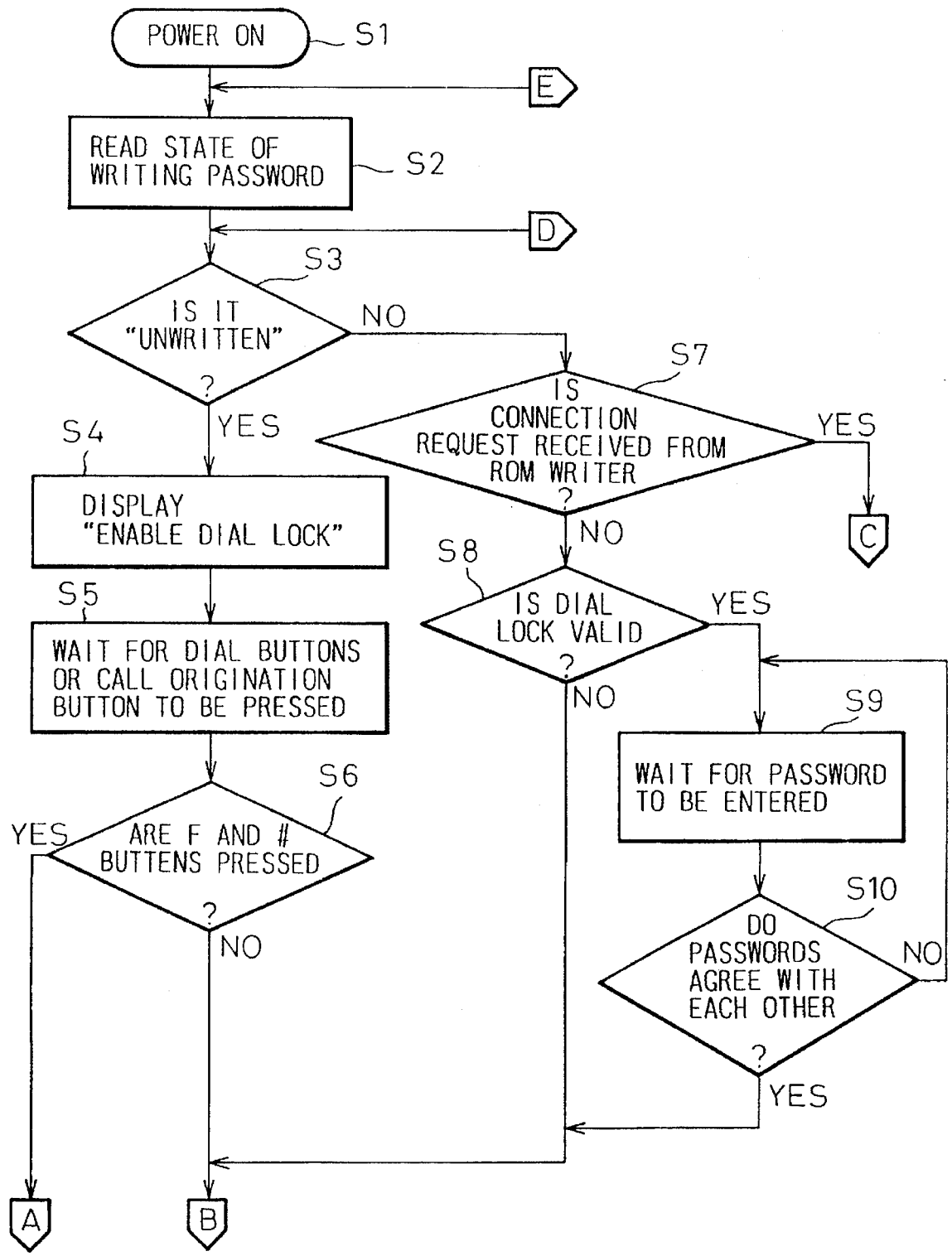
FIG. 4 is a flowchart for explaining actions in accordance with the embodiment of the present invention.

FIG. 3 is an explanatory diagram showing the ROM writer 20. Reference numeral 31 denotes a control unit composed of a microprocessor and others. 32 denotes an input unit composed of keys, such as a ten-key pad. 33 denotes a read-only memory (ROM) storing programs. 34 denotes an interface. 35 denotes a connector. 36 denotes a signal line.

The ROM writer 20 has the ability to enable the dial lock for the mobile unit 11. However, since the mobile unit 11 can enable the dial lock by itself, the ROM writer 20 need not especially have the ability to enable the dial lock. However, after dial lock is enabled for the mobile unit 11, it may become necessary to reset the dial lock so that another password can be used to enable the dial lock. For example, when a user returns a mobile unit, dial lock must be reset so that a new user can use another password to enable a dial lock.

The mobile unit 11 and ROM writer 20 are coupled with each other by means of the connectors 19 and 35. A connection request is issued by the input unit 32 of the ROM writer 20 so that the state of the password is reset to the initial value. The interface 34 is capable of performing the transformation that is required when a signal format differs between the ROM writer 20 and mobile unit 11. When identifying the connection request sent from the ROM writer 20, the microprocessor 17 of the control unit 6 in the mobile unit 11 transfers an address signal AD representing the fourth address and a control signal CS instructing reading to the memory 14. A password read from the fourth address is then sent as data DT to the microprocessor 17.

The microprocessor 17 runs a program stored in the ROM 15 so as to execute an operation such as encoding the password, and transfers the result to the ROM writer 20. In the ROM writer 20, the control unit 31 executes an operation such as interpretation so as to reproduce the password and then transfers the password to the mobile unit 11. The microprocessor 17 in the mobile unit 11 compares the password sent from the ROM writer 20 with the one read from the fourth address in the memory 14. If the passwords agree with each other, the microprocessor 17 recognizes that the ROM writer is authorized. In response to the request for resetting the state of the password to the initial value, the microprocessor 17 transfers an address signal AD representing the leading address, a control signal CS instructing writing, and data DT representing "unwritten" to the memory 14. Thus, "unwritten" is written at the leading address in the memory 14. In other words, the leading address is reset to the initial value. At this time, it is also possible to clear the password in the second address of the memory 14.

FIGS. 4, 5, 6, and 7 are flowcharts in accordance with the embodiment of the present invention. The flowcharts include steps S1 to S33 and show a sequence for enabling the dial lock for the mobile unit 11 and a sequence of disabling it. First, a user turns on the power supply of the mobile unit 11 (step S1). The microprocessor 17 of the control unit 6 in the mobile unit 11 reads the state of the password from the first memory area 4 at the leading address in the memory 14 (step S2), and determines whether the state of the password is "unwritten" (step S3). When it is "unwritten," that is, when a user has purchased a mobile unit and turns on the power supply for the first time, or before the state of the password is updated to be "written" as mentioned later, a message saying "Enable dial lock." appears on the display 3 (step S4). The mobile unit 11 waits for dial buttons or a call origination button to be pressed (step S5). In other words, it is waited for information to be entered at the input unit 2. Assuming that it is defined that a dial lock request is issued by pressing the F and # buttons, it is determined whether information entered at the input unit 2 includes signals F and # (step S6).

If it is found at step S3 that the state of the password is "written" but not "unwritten," it is determined whether a connection request signal is received from a ROM writer (step S7). When a connection request signal is not received from any ROM writer, it is determined whether dial lock is established (step S8). If dial lock is established, the mobile unit waits for a password to be entered (step S9). It is then determined whether a password entered at the input unit 2 agrees with the password set for enabling the dial lock (step S10). If they disagree with each other, it waits for another password to be entered. If the passwords agree with each other, control is passed to step S17 (See FIG. 4).

Figure 5:
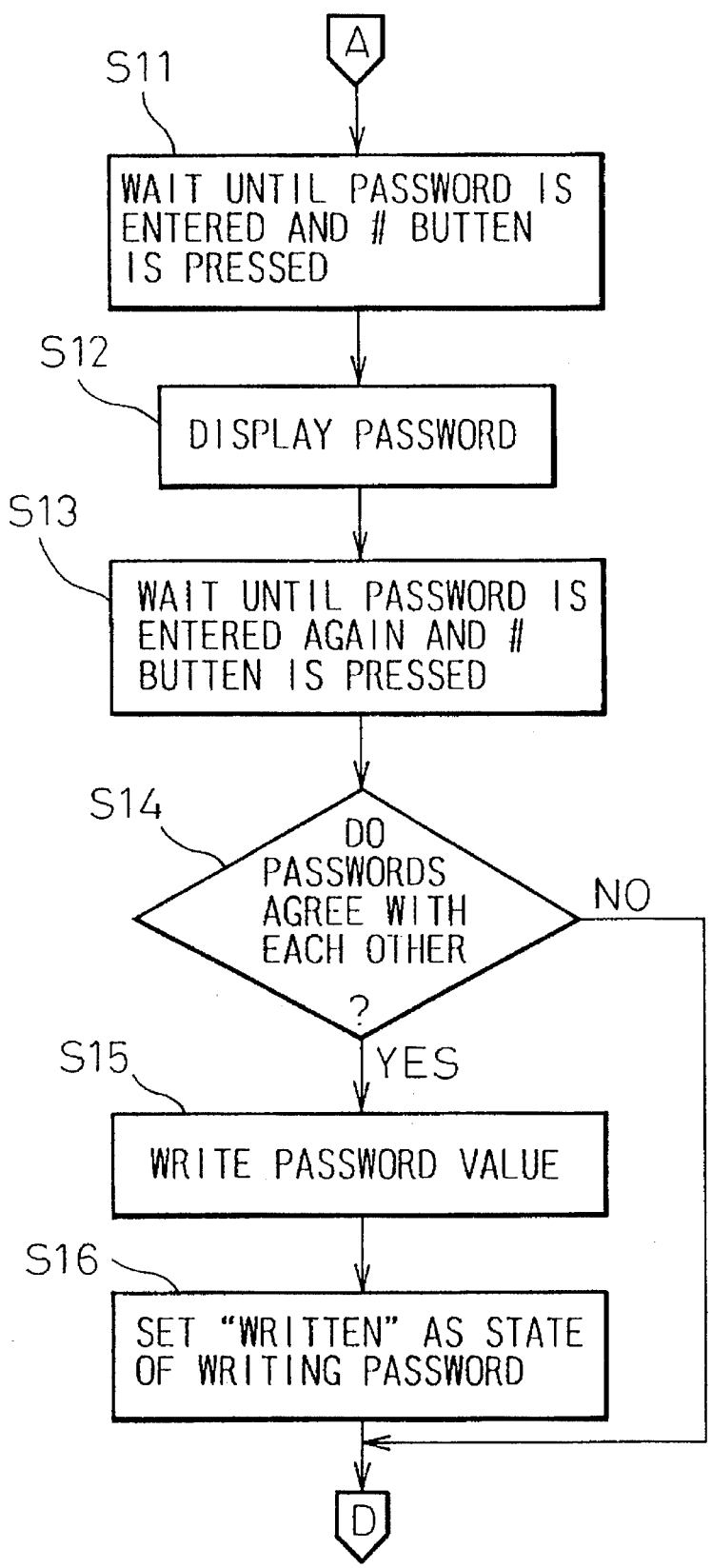
FIG. 5 is a flowchart for explaining actions in accordance with the embodiment of the present invention.
Figure 6:
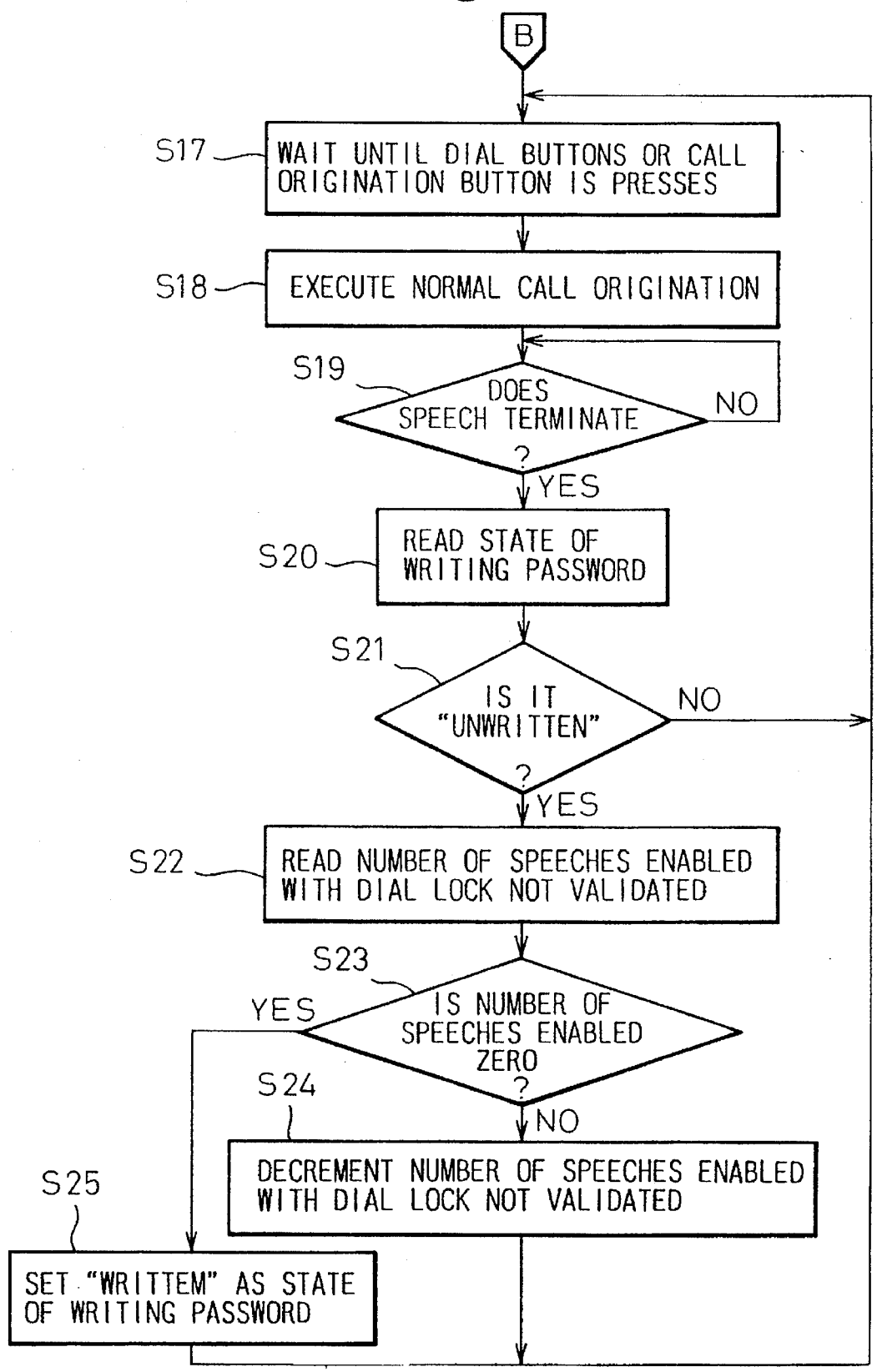
FIG. 6 is a flowchart for explaining actions in accordance with the embodiment of the present invention.
Figure 7:
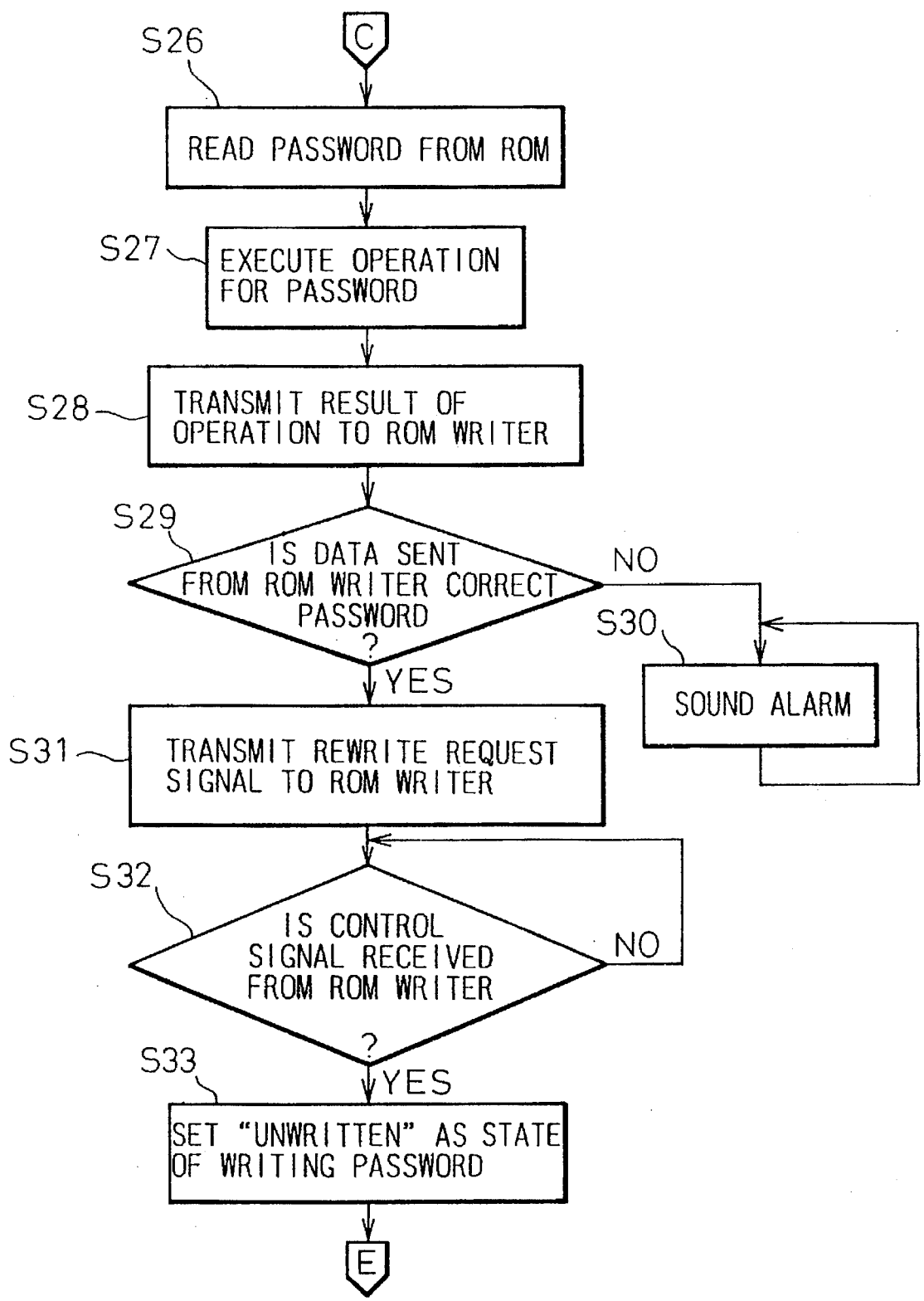
FIG. 7 is a flowchart for explaining actions in accordance with the embodiment of the present invention.

If it is found at step S6 that a dial lock request is entered, the mobile unit waits for a password to be entered and the # button to be pressed (step S11) (See FIG. 5). When a password of, for example, 7625 is entered at the input unit 2 and the # button is pressed, the password 7625 appears on the display 3 (step S12). The mobile unit then waits for another password to be entered and the # button pressed (step S13). When the user uses the input unit 2 to enter a password and press the # button, the password entered this time is compared with the one entered previously. It is determined whether they agree with each other (step S14).

If it is determined at step S14 that the passwords disagree with each other, control is returned to step S3. If it is determined that they agree with each other, the password value is written in the second memory area 5 at the second address in the memory 14 (step S15). The state of the password in the first memory area 4 at the leading address in the memory 14 is updated to "written" (step S16). At this time, the password entered first is displayed. Only when the password agrees with the one entered next, the password value is stored as a password set for validating dial lock. Once the password is set for enabling the dial lock, it cannot be modified. A user is therefore prompted to enter a password twice, so that the user can check if he/she has entered a password correctly. If this strict sequence of setting a password is unnecessary, the password entered first may be stored as a password set for enabling the dial lock.

Dial lock enabling is completed by following the foregoing sequence. The state of the password is now "written." It is therefore determined at step S3 that the state of the password is not "unwritten." Consequently, another attempt at enabling the dial lock therefore fails. Once dial lock is enabled, no other person can set the dial lock using an arbitrary password.

As mentioned above, after a password set for the dial lock has been set, if the power supply is turned on, since the state of writing a password is "written," control is passed to step S8 via steps S2, S3, and S7. At step S8, it is determined whether dial lock is enabled by a user. For this determination, a dial lock flag may be set at step S16. However, when the state of a password in the first memory area 4 is "written," if the password set in the second memory area 5 does not indicate that dial lock is disabled, it is determined that dial lock has been enabled. When dial lock is enabled by a user, Dial Lock is specified. The mobile unit then waits for a password set for enabling the dial lock to be entered (step S9). It is determined whether an input password agrees with a password set for enabling the dial lock (step S10). If they disagree with each other, control is returned to step S9. The mobile unit then waits for another password to be entered. The number of passwords that can disagree with the password set for validating dial lock may be predetermined. Then, when the number of entries resulting in disagreement reaches the predetermined number, all subsequent entries may be invalidated.

If it is found at step S3 that the state of a password is "written," control is passed to step S7. At step S7, as described previously, it is determined whether a ROM writer is connected. When calling, a ROM writer is not connected. Control is therefore passed to step S17 via step S8 or steps S8, S9, and S10 (See FIG. 6). When the state of the password is "unwritten," and if a dial lock request is not issued, control is passed to step S17.

At step S17, the mobile unit waits for any dial buttons or the call origination button to be pressed. When a unit number of a subscriber is entered at the input unit 2 and the call origination button is pressed, normal call origination is executed (step S18). The called subscriber answers the call and the call proceeds. It is then determined whether the call terminates (step S19). When the call terminates, the state of the password is read from the first memory area 21 at the leading address in the memory 14 (step S20). It is then determined whether the state of the password is "unwritten" (step S21).

When the state of the password is "written," control is returned to step S17. When the state of the password is "unwritten," the number of calls enabled with dial lock not validated is read from the third memory area at the third address in the memory 14 (step S22). In FIG. 2, a value 3 is set as the number of calls enabled in the memory 14. It is then determined whether the number of calls enabled is 0 (step S23). If it is not 0, the number of calls is decremented by one (step S24). Assuming that 3 is initially set as the number of calls enabled, when a call is completed, the number of calls enabled becomes 2. After three calls are completed, the number of calls enabled is 0. In this case, the state of the password is updated to be "written" (step S25).

When the state of the password is updated, the password set in the second memory area 5 at the second address in the memory 14 may be reset to a value indicating that dial lock is not established, for example, 0000. Assuming that dial lock is not enabled and the mobile unit 11 is used for normal calls, when the number of calls reaches a predetermined value, the state of the password is updated to be "written." Thereafter, it is not possible to enable a dial lock using another password.

Once the state of the password is changed to "written," dial lock enabling and password modification are disabled. A ROM writer is installed in a reliable office. A mobile unit is connected to a ROM writer. Only when specific conditions are satisfied, the state of a password can be reset to an initial value. Specifically, as shown in FIG. 2, the ROM writer 20 is connected to the mobile unit 11, and a connection request signal is sent to the mobile unit 11 by manipulating the input unit 32 of the ROM writer 20. At step S7 (See FIG. 4), it is determined whether this event occurs.

Figure 8:
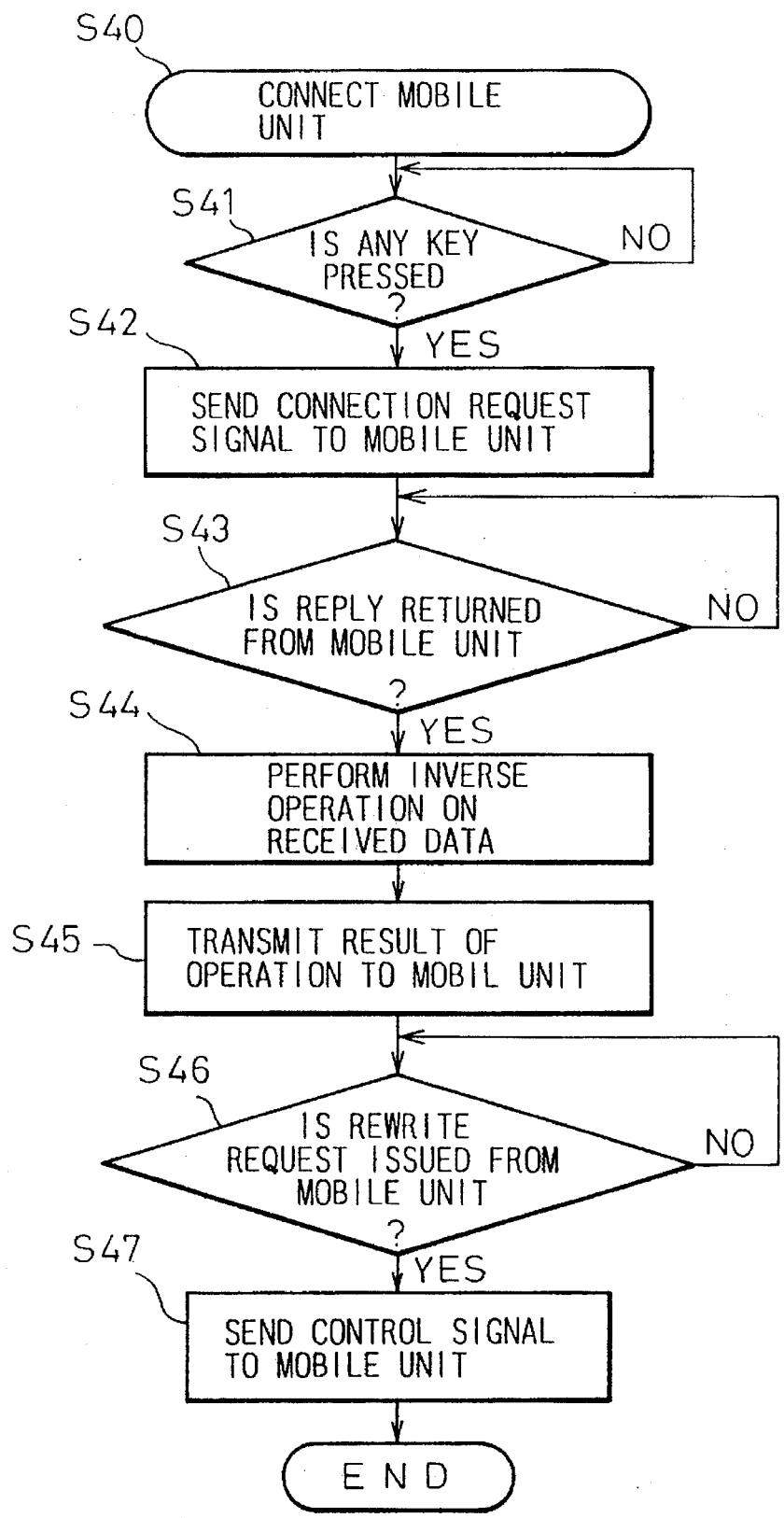
FIG. 8 is a flowchart for explaining actions of a ROM writer in accordance with the embodiment of the present invention.

The ROM writer 20 acts as shown in FIG. 8. The actions will be described in conjunction with the actions of the mobile unit 11 shown in FIG. 7. The ROM writer 20 is connected to the mobile unit 11 via a connector (step S40). The control unit 31 in the ROM writer 20 determines whether any key of the input unit 32 is pressed (step S41). When a key is pressed in order to issue a connection request to the mobile unit 11, the control unit 31 produces a connection request signal and sends it to the mobile unit 11 via the interface 34.

In the mobile unit 11, at step S7 (See FIG. 4), it is determined whether a connection request signal is received from a ROM writer. If a connection request signal is received, control is passed to step S26 (See FIG. 7). At step S26, the microprocessor 17 of the control unit 16 in the mobile unit 11 reads a password, for example, 9308899 from the fourth memory area 24 at the fourth address in the memory 14. The password is then subjected to an operation such as encoding (step S27). The result of the operation is transmitted to the ROM writer (step S28).

After sending a connection request signal to the mobile unit 11, the ROM writer 20 determines whether a reply is returned from the mobile unit 11 (step S43). When a reply; that is, the result of performing an operation on the password is returned from the mobile unit 11, an inverse operation is performed in order to interpret the encoded password (step S44). A program performing an operation is pre-stored in, for example, the ROM 15 in the mobile unit 11, so that it cannot be read externally. A program performing an operation whose logic is inverse to that of the above operation is stored in the ROM 33 in the ROM writer 20.

A result of an inverse operation performed in the ROM writer 20 is sent to the mobile unit 11 (step S45). That is to say, when the ROM writer is an authorized one, the inverse operation enables reproduction of a correct password. The mobile unit 11 determines whether the data sent from the ROM writer is a correct password (step S29). A ROM writer which has failed in reproducing a password is not an authorized one. Therefore, if the data sent from the ROM writer is not a correct password, an alarm is sounded (step S30). If the data sent from the ROM writer is the correct password, a rewrite request signal is sent to the ROM writer 20 (step S31).

The ROM writer 20 determines whether a rewrite request signal is received from the mobile unit 11 (step S46). If a rewrite request signal is received, the ROM writer 20 transmits a control signal instructing that the state of a password should be rewritten to be "unwritten" (step S47). The mobile unit 11 determines whether a control signal is received from the ROM writer 20 (step S32). If a control signal is received, the state of the password in the first memory area 21 at the leading address in the memory 14 is updated to be "unwritten." This causes the mobile unit 11 to enter the initial state. At this time, it is also possible to clear the password set in the second memory area at the second address in the memory 14.

When the ROM writer 20 is manipulated as mentioned above, the dial lock of the mobile unit 11 is unlocked and the mobile unit 11 is returned to the initial state. The mobile unit 11 can now be handed to a new user. The user can use a new password to establish a dial lock in the mobile unit 11. Specific ROM writers alone can reset the dial lock. The mobile unit 11 therefore cannot be used illegally.

The present invention is not limited to the aforesaid embodiment but may be expanded or modified in various aspects. For example, the mobile unit 11 may be designed to be capable of not only of transmitting and receiving speech but also data. The memory 14 is not restricted to an EEPROM. Alternatively, any kind of memory can be used as long as when the power supply of the mobile unit 11 is turned off, a state of the password, a password, the number of calls enabled, or the like which resides in the memory will not be deleted.

We claim:

1. A mobile unit for achieving radio transmission and reception relative to a base station, comprising:

means for transmitting and receiving signals to and from said base station by radio telephony;

user input means for use by a user in entering information and in entering a dial lock signal;

display means;

a first memory in which "unwritten" or "written" is stored as a state of a password set for dial lock prevention of unauthorized use of said mobile unit;

a second memory in which a password from said dial lock signal and set for dial lock preventing unauthorized use of said mobile unit, is stored; and control means for controlling said transmitter and receiver means and said display means, for determining whether said dial lock signal is supplied from said input means, and when it is determined that said dial lock signal is supplied, for writing a password entered by said user at said input means into said second memory, and for changing the state of a password in said first memory from "unwritten" to "written".

2. A mobile unit according to claim 1, wherein only when said state of a password in said first memory is "unwritten," said control means enables dial lock which prevent unauthorized use in response to said dial lock signal supplied from said input means; and when said state of a password in said first memory is "written," said control means does not validate dial lock in response to said dial lock signal supplied from said input means.

3. A mobile unit according to claim 1, further comprising means for connecting a ROM writer that allows said control means to modify the dial lock password.

4. A mobile unit according to claim 3, wherein said control means determines whether said ROM writer connected via said connecting means is authorized.

5. A mobile unit according to claim 1, further comprising a third memory, in which a frequency of transmission and reception that is allowed with dial lock disabled, is stored, wherein when the frequency of transmission and reception performed with dial lock disabled exceeds the allowed number of transmissions and receptions in said third memory, said control means changes said state of a password in said first memory from "unwritten" to "written" and writes in said second memory a password meaning that dial lock is disabled.

6. A method for enabling a dial lock to prevent unauthorized use of a mobile unit having a transmitter receiver means, user input means, display means, a first memory in which "unwritten" or "written" is stored as a state of a password for enabling the dial lock, a second memory in which a password for enabling the dial lock is stored, and control means, comprising the steps of:

when said state of a password for enabling the dial lock, which resides in said first memory, is "unwritten" and a dial lock signal is supplied by a user from said user input means, storing a password included in said dial lock signal entered by said user at said input means in said second memory; and changing said state of a password in said first memory from "unwritten" to "written".

7. A method for enabling a dial lock to prevent unauthorized use of a mobile unit having a transmitter receiver means, user input means, display means, a first memory in which "unwritten" or "written" is stored as a state of a password for enabling the dial lock, a second memory in which a password set for enabling the dial lock is stored, and control means, comprising the steps of:

when said state of writing a password set for enabling the dial lock, which resides in said first memory, is "unwritten" and a dial lock signal is supplied by a user from said user input means, determining whether a first password entered at said input means agrees with a second password included in said dial lock signal;

when these two passwords agree with each other, storing the password value in said second memory; and changing said state of a password in said first memory from "unwritten" to "written".

8. A method for enabling a dial lock of a mobile unit for a mobile unit having a transmitter receiver means, user input means, a display means, a first memory in which "unwritten" or "written" is stored as a state of a password for enabling the dial lock, a second memory in which a password set for enabling the dial lock is stored, and a control means, comprising steps of:

when said state of a password for enabling the dial lock, which resides in said first memory, is "unwritten" and a password is to be stored in said second memory with no dial lock signal supplied from said input means, storing in said second memory a password meaning that dial lock is disabled; and changing said state of the password in said first memory from "unwritten" to "written."

9. A method for enabling a dial lock of a mobile unit for a mobile unit having a transmitter receiver means, user input means, a display means, a first memory in which "unwritten" or "written" is stored as a state of writing a password set for enabling the dial lock, a second memory in which a password set for enabling the dial lock is stored, and a control means, comprising steps of:

when said state of a password for enabling the dial lock, which resides in said first memory, is "unwritten" and it is determined that the number of transmissions and receptions performed by said mobile unit exceeds the number of transmissions and receptions enabled in a third memory, storing in said second memory a password meaning that dial lock is disabled; and changing said state of a password in said first memory from "unwritten" to "written."

10. A method for enabling a dial lock of a mobile unit for a mobile unit having a transmitter receiver means, user input means, a display means, a first memory in which "unwritten" or "written" is stored as a state of a password for enabling the dial lock, a second memory in which a password for enabling the dial lock is stored, and a control means, comprising steps of:

connecting said mobile unit to an external ROM writer;

allowing said mobile unit to execute an operation on a password residing in said second memory and transmit a resultant coded password to said ROM writer;

allowing said ROM writer to execute an inverse operation on a received coded password and transmit a resultant password to said mobile unit;

allowing said mobile unit to compare said password residing in said second memory with said password received from said ROM writer and thus determine whether said ROM writer is authorized; and when it is determined that said ROM writer is authorized, changing the contents of said first memory from "written" to "unwritten."

\* \* \* \* \*